(12) United States Patent
Biwersi et al.

(10) Patent No.: US 9,714,849 B2
(45) Date of Patent: Jul. 25, 2017

(54) POSITION-INDICATING MODULE WITH ILLUMINATED AXIS

(71) Applicant: MOVING MAGNET TECHNOLOGIES, Besançon (FR)

(72) Inventors: Stéphane Biwersi, Frambouhans (FR); Michael Delbaere, Avanne (FR)

(73) Assignee: MOVING MAGNET TECHNOLOGIES (MMT), Besancon (FR)

( * ) Notice: Subject to any disclaimer, the term of this patent is extended or adjusted under 35 U.S.C. 154(b) by 247 days.

(21) Appl. No.: 14/373,804

(22) PCT Filed: Jan. 21, 2013

(86) PCT No.: PCT/FR2013/050125
§ 371 (c)(1),
(2) Date: Dec. 17, 2014

(87) PCT Pub. No.: WO2013/110886
PCT Pub. Date: Aug. 1, 2013

(65) Prior Publication Data
US 2015/0123651 A1     May 7, 2015

(30) Foreign Application Priority Data
Jan. 23, 2012 (FR) ..................... 12 50608

(51) Int. Cl.
*G01D 7/00* (2006.01)
*G01B 7/00* (2006.01)
*H01H 9/16* (2006.01)

(52) U.S. Cl.
CPC ............ *G01D 7/005* (2013.01); *G01B 7/003* (2013.01); *G01B 2210/58* (2013.01); *H01H 9/161* (2013.01)

(58) Field of Classification Search
CPC .... G01D 7/005; G01B 7/003; G01B 2210/58; H01H 9/161
See application file for complete search history.

(56) References Cited

U.S. PATENT DOCUMENTS 5,706,757 A * 1/1998 Hashimoto ............ G01D 11/28
116/288
6,909,355 B2    6/2005 Hashimoto et al.
(Continued)

FOREIGN PATENT DOCUMENTS

DE         2337409 A1    2/1975
DE       20218508 U1    2/2003
(Continued)

OTHER PUBLICATIONS

EP 2327964 A2—English translation.*

*Primary Examiner* — Patrick Assouad
*Assistant Examiner* — Haidong Zhang
(74) *Attorney, Agent, or Firm* — Harness, Dickey & Pierce, PLC

(57) ABSTRACT

The present disclosure relates to a position-indicating module including a position sensor consisting of a mobile element, able to be driven directly by an operator or by a mechanical or electromechanical drive element, and of a detection assembly delivering electrical information dependent on the position of the mobile assembly, as well as at least one illumination element including at least one light source, wherein the mobile assembly includes a zone able to allow through the light beam issuing from the illumination element and the illumination element is situated opposite the zone.

23 Claims, 7 Drawing Sheets

(56) References Cited

U.S. PATENT DOCUMENTS

| | | |
|---|---|---|
| 7,332,686 B2 | 2/2008 | Parnell |
| 8,072,209 B2 | 12/2011 | Jerance et al. |
| 8,347,807 B2 | 1/2013 | Sigg et al. |
| 8,519,700 B2 | 8/2013 | Jerance et al. |
| 2011/0254543 A1 | 10/2011 | Frachon et al. |
| 2013/0169270 A1 | 7/2013 | Delbaere et al. |
| 2013/0179117 A1 | 7/2013 | Delbaere et al. |
| 2013/0328670 A1 | 12/2013 | Bruninghaus et al. |

FOREIGN PATENT DOCUMENTS

| | | | | |
|---|---|---|---|---|
| DE | 202006012204 U1 | 10/2006 | | |
| DE | EP 2327964 A2 * | 6/2011 | ............. | G01D 13/26 |
| EP | 2327964 A2 | 6/2011 | | |

\* cited by examiner

POSITION-INDICATING MODULE WITH ILLUMINATED AXIS

CROSS-REFERENCE TO RELATED APPLICATIONS

This application is a National Phase Entry of International Application No. PCT/FR2013/050125, filed on Jan. 21, 2013, which claims priority to French Patent Application Serial No. 1250608, filed on Jan. 23, 2012.

TECHNICAL FIELD

The present invention relates to the field of contactless position indicators, and specifically those having a through shaft.

The invention more particularly relates to a position-indicating module comprising a position sensor consisting of:

a mobile element able to be driven directly by an operator or by a mechanical or electromechanical drive element, and a detection assembly delivering electrical information dependent on the position of the mobile assembly.

The detection assembly is without mechanical or electrical contact with the mobile assembly. At least one light source comprising at least one illumination element is provided to achieve the lighting.

BACKGROUND

In the state of the art, technologies of contactless sensor having a through shaft are known, which have been developed for travels of less than or equal to 360° as disclosed in particular in the applicant's patent applications EP1949036 and EP1989505.

Such solutions particularly apply to miniature angular sensors with travels of approximately 360° intended to be mounted directly onto printed circuits. They thus allow advantageously replacing potentiometric solutions (with contact) in terms of service life and performances while allowing the sensor to receive various types of shafts, thanks to the through shaft design thereof. They are based primarily on the use of a ring or tile type permanent magnet the rotation of which is detected by one or more magneto-sensitive elements situated on the periphery of the magnet in a plane perpendicular to the axis of rotation.

One of the uses that can be imagined for these solutions is that the sensor receives, as a shaft, an "indicator" (e.g. heating control button or air-conditioning on a dashboard, control panel on an industrial machine etc. . . . ) making it possible to visually communicate information to a user about the angular position of the indicator, which is itself directly related to the angle of rotation of the sensor axis. More specifically, it may be interesting to illuminate this button.

The patent application EP2327964 is known in the state of the art, which discloses a measuring apparatus using a detection position assembly as disclosed in the application EP1949036, with the axis accommodating a pointer intended to communicate a visual indication due to its position opposite a graduated dial. Illumination means of the light emitting diode (Light Emitting Diode) type situated on the periphery of the sensor are so arranged as to light the dial. Visual effects, dependent on whether the diode or diodes is/are supplied or not or whether diodes of different colors are used or not, are also suggested.

However, this solution is extremely cumbersome as it implements a number of components (light emitting diodes) separated so as to obtain proper lighting according to the desired visual effects. In addition, as the light sources are substantially spaced from one another, this may affect the quality and consistency of the various colors implemented.

Eventually using a dial on the periphery of the sensor adds to the complexity and does not allow a transmission of visual information directly via the mobile part.

In the field of car instrumentation (control of dashboard indicators by a step-by-step motor) it is now usual to illuminate the indicator (pointer) via a light emitting diode placed under the engine just under the translucent axis of the pointer, using solutions of step-by-step motors with a hollow axis as disclosed for example in the patent application EP 2035783.

The advantage of these concepts is to allow an optimal illumination of the axis and to minimize the number of required emitting diodes (one is enough a priori), as opposed to solutions wherein the light emitting diodes are mounted outside the axis of revolution of the pointer.

However, using an engine is not necessary in a certain number of configurations where the position of the indicator is directly defined by a physical effect or by the user. Furthermore, the motorization solutions as described above comprise no solution providing the detection of position integrated in and dedicated to variable lighting effects. Due to the small diameters of the axes of these engines (typically a few millimeters), they do not make it possible, in any event, to integrate several components opposite the translucent axis.

Patent DE2337409 is also known, which discloses a button with a magnetically actuated switching device, with one of the actuating means by a permanent magnet mobile switching key of a control element used which further comprises a pilot lamp, characterized in that the actuating means is formed at least partially from the body of the pilot lamp. Contact springs are provided for the electrical contacting of the pilot lamp.

The patent application US2007/117868 discloses a remote control electrical switch with omnidirectional access providing remote control of electrically connected devices. The remote controlled electrical switch allows electrical devices to be controlled with minimal physical dexterity, easing the physical efforts required for typical functions of the electrical switching devices.

The patent application DE202006012204 discloses a lamp having an illuminating handle section which surrounds the lamp cover and acts on the switch and/or a dimmer. The handle section can be displaced and/or rotated relative to the lamp cover and can be lit up by a further low voltage light as one or more LED(s) which light(s) up independently of the switching position of the switch which operates the light. The handle section may have a transparent end surface.

The patent application US2007/117868 discloses a potentiometer of the rotating type with a variable resistor comprising lighting. A case comprises a round base plate, a cylindrical outer wall projecting in a first direction, and a cylinder. This case accommodates an annular insulating substrate having a resistance with a conductive film on its surface turned in the first direction.

An actuating button comprises a cylindrical rotating actuating element mounted on the cylinder and a flange having a resistor and a slide diode sliding on one face in a second direction opposite the first direction.

The document DE20218508 discloses a door locking button having a button body of a transparent material which is illuminated by at least one light source, for example a colored LED, at its lower end, offset to one side of its central axis.

The transparent material of the button body may incorporate light dispersion and/or reflection bubbles or particles, with the light source.

SUMMARY

The present invention therefore primarily aims at providing a solution making it possible to communicate to a user, in a simple and compact way, information on the relative or absolute visual position, using at least one point light source. The module has an interface of the hollow axis type making it possible to receive an external translucent mechanical interface (indicator, button). The position sensor provides a signal dependent on the position that incidentally allows controlling the lighting state of the light source.

More particularly, the invention relates to a position-indicating module comprising a position sensor consisting of a mobile element able to be driven directly by an operator or by a mechanical or electromechanical drive element, and a detection assembly delivering electrical information dependent on the position of the mobile assembly, without contact with the mobile assembly, as well as at least one illumination element comprising at least one light source, characterized in that the mobile assembly comprises a zone able to allow through the light beam issuing from said illumination element and in that the illumination element is situated opposite said zone.

The invention thus avoids the difficulties encountered with solutions wherein the LED is mobile and supplied from mobile elements, which reduce the reliability and require the use of a device without electrical contact.

The invention thus avoids the disadvantages of the prior document DE2337409 wherein the magnet is integral with the diode, which is not mechanically easy and in addition produces undesirable heating of the magnet by the diode.

The detection assembly is a position sensor without electrical or mechanical contact electromagnetically interacting with a magnet.

The light source is fixed and opposite (so without contact—too) the mobile assembly. The moving assembly (the mechanical interface) is an external element relative to the LED.

The state of the power supply of the illumination element is preferably dependent on the signal delivered by the detection assembly.

The light source is advantageously situated on the side.

The invention is thus primarily based on the use of a position sensor consisting of a mobile element and a fixed detection element which will be able to deliver a signal (typically a voltage) dependent on the position of the mobile element. This mobile element will comprise an opening that will allow through a light beam issuing from an illumination means.

In one alternative embodiment, the sensor is of the rotating, absolute or incremental type, with the opening then typically corresponding to the configuration of a sensor with a through axis or a hollow axis. The illuminating means may ideally be placed on the axis of rotation of the sensor opposite said opening. Using an absolute or incremental multi-turn sensor may also be easily considered.

In a second alternative embodiment, the sensor will be of the linear type. In the case of an axisymetric linear alternative solution, the illumination means will ideally be situated on the axis of symmetry of the structure.

The zone able to allow through the light beam is preferably an opening with a button situated in said opening. The button is advantageously integral with the mobile assembly.

In a particular embodiment, this button is partially made of a translucent material able to guide the light issuing from the illumination element. According to an alternative solution, it will be integral with the mobile assembly. A wide range of shapes can thus be imagined for this button, for example a shape approaching that of a pointer, with said pointer being able to subsequently give visual information on a dial simultaneously with the visual information produced by the illumination.

In a particular embodiment the detection assembly delivers an absolute signal proportional to the position of the mobile element.

In another particular embodiment the detection assembly delivers a signal as discrete stages dependent on the position of the mobile element.

In a particular embodiment, the color or the intensity of the light emitted by the illumination element are dependent on the signal delivered by the detection assembly.

In a particular embodiment, the color or the intensity of the light emitted by the illumination element varies continuously and proportionally to the signal delivered by the detection assembly.

In another particular embodiment, the color or the intensity delivered by the illumination element varies discretely according to the signal delivered by the detection assembly.

In an alternative embodiment, the illumination element comprises a plurality of light sources substantially situated at the same point. Said light sources can then each emit a different color.

In a preferred embodiment, the illumination element is a light emitting diode (LED), optionally a multicolored light-emitting diode (LED), the detection assembly comprises at least one magneto-sensitive probe and the mobile element comprises at least one magnetic flux generating element.

The position sensor can measure the linear position of mobile assembly in the case of a linear displacement or measure the rotational position in the case of a rotating sensor or measure the combination of the linear and rotational movement in the case of a bi-directional sensor.

The illumination element or elements is/are preferably situated on the axis of rotation or of symmetry of the mobile assembly.

In most configurations, the detection assembly and the illumination element are arranged in the same plane and on the same printed circuit and preferably arranged in the same case.

The position-indicating module according to the invention can thus also be suitably associated with a set of magnets constituting a magnetic coupling module intended for modulating the torque felt by the user of the mobile element of the position-indicating module with a view to provide him/her with the sensation of preferential positions during the rotation or the linear movement of the mobile element. In a smarter embodiment, the magnet which may be used to perform the detection within the position-indicating module and the mobile magnet of the magnetic coupling are just one.

The position-indicating module according to the invention may also be judiciously associated with an electromechanical drive assembly so as to build a positioning assembly, with the position detection being directly performed either on the axis of the drive element (typically a motor or an electric actuator), or on the output axis of the reducer, if the system is a drive element coupled to a reducing gear. The illumination element may then be situated either on the axis of rotation of the drive element (or opposite the axis of movement in case of a linear drive) or on, or opposite the output axis of the gear motor, as appropriate. In a smarter alternative solution, the position detection can be performed using the magnet of the drive element.

When the drive element is electric, the mobile element of the position-indicating module is integral with the mobile part of the electric drive element whether the drive element is a gear motor (for example gear train) or a system with a rotating or linear direct drive.

As regards the position sensor, one of the most interesting possibilities consists in using a magnetic solution, with the mobile element being for example composed of a permanent magnet and the measuring assembly comprising at least one magneto-sensitive probe (of the Hall sensor or magneto-resistive type) able to detect the position of the mobile element via a measurement of the variation of the amplitude or of the rotation of the magnetic field induced by the displacement of the mobile part.

In one alternative solution, the probe will provide an item of information proportional to the position of the mobile part. Alternatively, it may provide a signal as a stage (typically a digital output with a high state if the mobile element is in a given range position, and a low state if it is in the complementary range as compared to the total travel).

One of the major interests of the invention presented here is to provide, with a simple configuration, light information varying according to the position of the mobile element. Thus, it can be considered that the state of the illumination means (e.g. off/on), or the color or the intensity issuing from said means, varies with the position information provided by the detection assembly, either continuously or discretely.

In the case of a multi-turn sensor having information indicating the turn which the device is making, possibly together with an item of information on the position within this tour, can be expected.

A particularly elegant solution consists in using a multi-colored LED as illumination means. As a matter of fact, this type of component has the capacity to transmit simultaneously, in the same case, several colors (typically three: Red, Green, Blue, as per the reference of Avago's ASMT-QTB2) with the ability to modulate the intensity of the colors emitted according to the configuration of its power supply. Unlike the solution described in the patent application EP 2035783, color variation effects can be obtained as issued from co-located light sources with a single illumination means. As a matter of fact, such a component has the specificity of integrating light sources each separated by a distance of less than one millimeter.

Color variations, either continuous or discrete, can thus be obtained with a single component according to the position of the element and to the output signal of the detection element, with an illumination quality and uniformity independent of the emitted color, including opposite light passing zones of very small dimensions.

It should also be noted that this invention is particularly applicable to the miniature angular sensors, since it allows, with a small magnet of the ring type, a single magneto-sensitive probe (e.g. of the MLX90316 or HAL3625 type) and a light emitting diode placed on the axis of rotation, to achieve in a case a position-indicating module having a hollow axis wherein different types of buttons can be added according to the application.

The mobile element may be driven by an operator or energized by a mechanical system, optionally issuing from a system for converting a measured variable (for example, a fluid level sensor with a float connected to a lever the axis of rotation of which is integral with the mobile element).

The invention will be better understood from the description of the figures hereunder.

DETAILED DESCRIPTION OF THE EMBODIMENTS

Figure 1:
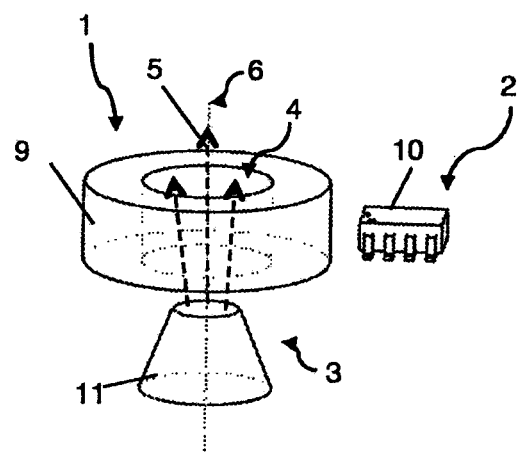
FIG. 1 shows a schematic view of the position-indicating module in a first rotating embodiment.

FIG. 1 schematically shows the position-indicating module according to its most basic configuration applied to an angular sensor travel which can cover up to 360°. The mobile element 1 consists of a permanent magnet 9 of the ring type, which is, for example, diametrically magnetised and associated with a magneto-sensitive probe 10 able to measure the rotation of the magnetic field induced the rotation of the magnet 9, such as taught in patent application EP1949036.

The tubular shape of the magnet 9 thus releases, in its center, an opening 4 which defines a zone able to allow through the light. The inner section of the ring-shaped magnet 9 is of the same order of magnitude as the cross-section of the light source 11, i.e. the magnet 5 has a recess of an inner section ranging from 1.5 to 0.7 times the section of the light source 11 and of course larger than the section of the light source when it is accommodated inside the ring-shaped magnet.

An illumination element 3 consisting of a light emitting diode 11 and advantageously placed under or inside the magnet, opposite the opening 4 and on the axis of rotation 6 of the permanent magnet 9, thus generating a light beam 5.

In all the following illustrations the illumination element 3 is represented as a light emitting diode 11 which is a preferred but non-limiting means.

Figure 2A:
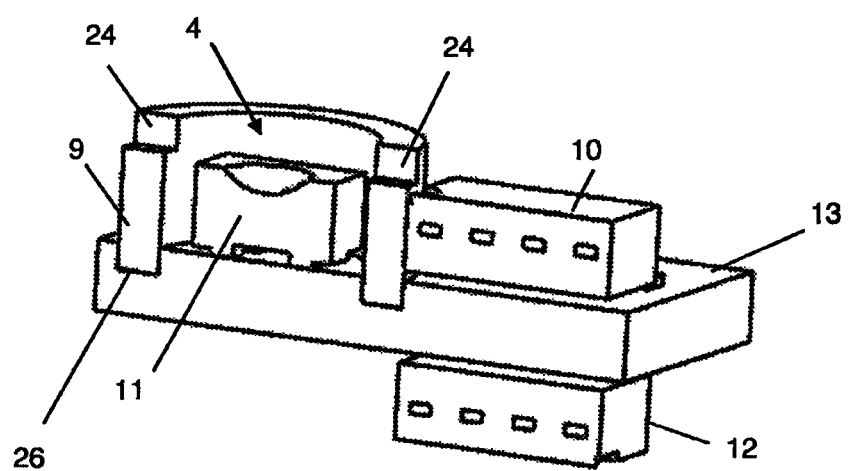
FIGS. 2a and 2b respectively show a sectional view and a detailed perspective view of the position-indicating module in the first rotating embodiment.
Figure 2B:
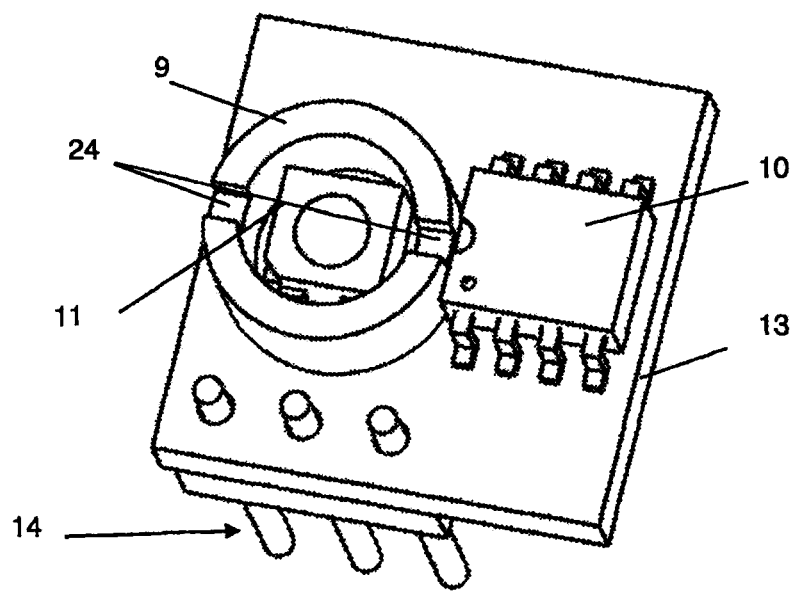

FIGS. 2a and 2b show a more complete configuration of the position-indicating module respectively as a sectional view and a full view. Advantageously, the mobile element 1 consists of a ring-shaped permanent magnet 9 having an opening 4 able to receive various buttons.

The magnet advantageously has two grooves 24 allowing to index a button (not shown) actuated by the user or an external mechanical element.

All the light emitting diode 11, probe 10 and optionally microcontroller 12 components are connected to the same printed circuit 13.

An electric connector 14 for the connection and output of the signal is also installed on the printed circuit 13, shown here as three connecting lugs. The microcontroller 12 thus allows receiving and processing information from the probe 10 for controlling the lighting of the light emitting diode 11.

The printed circuit 13 is used both for the electric connection of the various components (light-emitting diode 11, probe 10, microcontroller 12 and connector 14 as appropriate), and the mechanical assembly of these components. The printed circuit 13 ensures the precise positioning of the magnet 9 relative to the probe 10. The probe 10 is positioned along a radial axis of the magnet 9, and of the light emitting diode 11 placed coaxially relative to the magnet 9.

To ensure the guiding in rotation of the magnet, the printed circuit 13 has an annular groove 26 extending in a part of the thickness of the insulating plate. This groove 26 has dimensions similar to the section of the magnet 9 to form a journal bearing forcing the mechanical positioning of the magnet by allowing a degree of freedom in axial rotation.

Figure 3A:
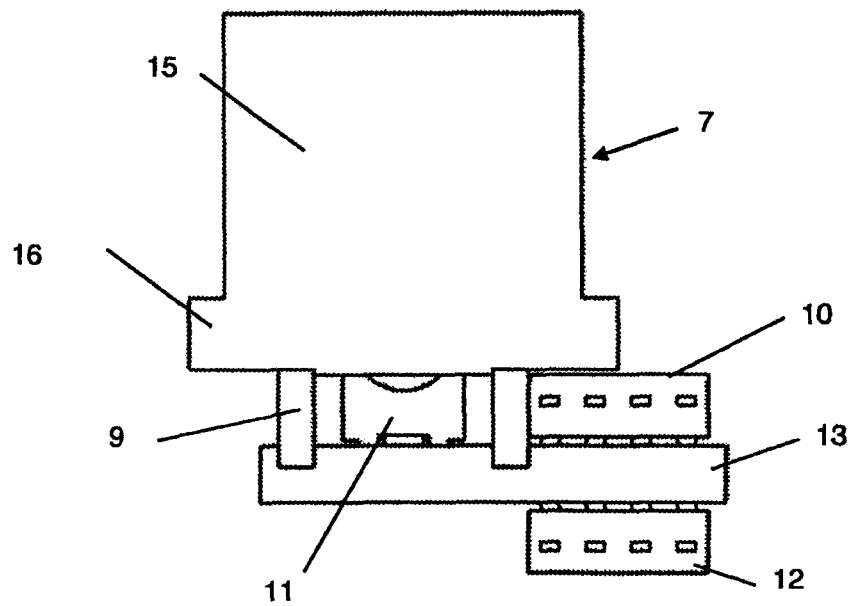
FIGS. 3a and 3b respectively show a sectional view and a detailed perspective view of the position-indicating module in a second rotating embodiment.
Figure 3B:
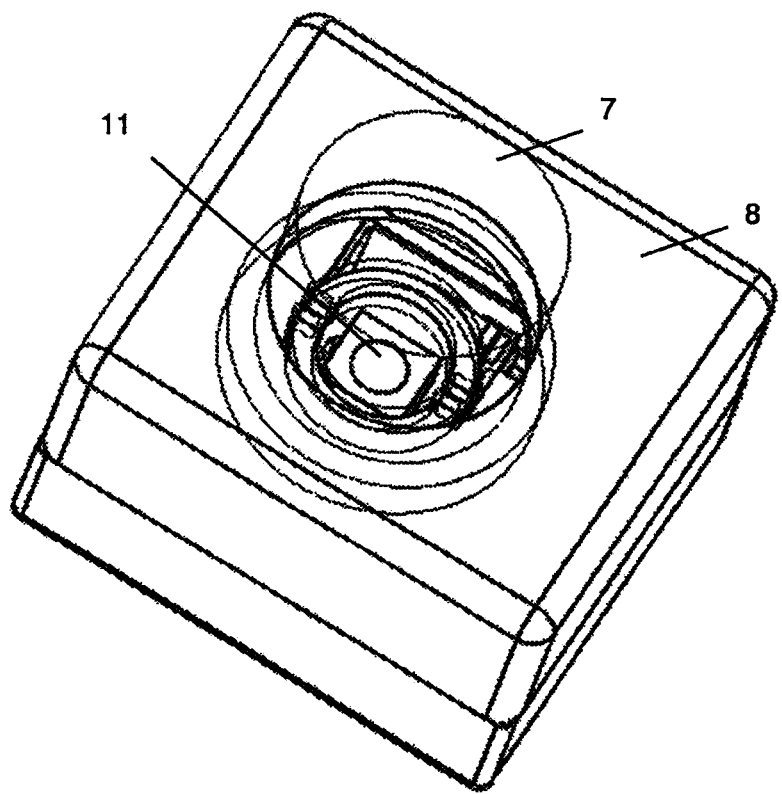

FIGS. 3a and 3b respectively show a side view and a full view of a construction typically adapted to a "universal" miniature rotating sensor wherein all the components are encapsulated in a single case 8 which can be seen in the single FIG. 3b. FIG. 3a also shows a button 7 consisting of a central portion 15 made of a translucent material able to guide the light and a covering 16 e.g. made of an opaque plastic material. The main dimensions are typically but not limited to, for the magnet, an internal diameter of 7 mm, an external diameter of 5 mm and a height of 3.5 mm and for the Hall probe of the MLX90316 type a parallelepiped, 5 mm×4 mm×1.5 mm in dimensions.

Figure 4:
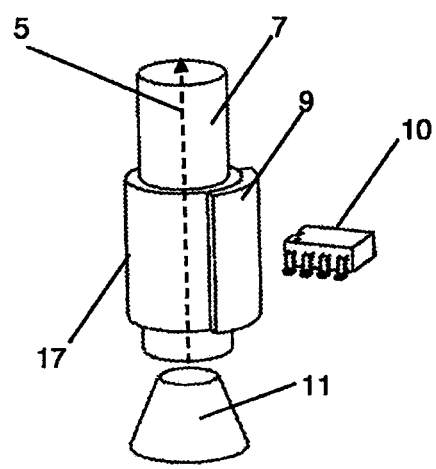
FIG. 4 shows the position-indicating module in a first linear embodiment.

FIG. 4 schematically shows a linear alternative solution. The mobile element 1 consists of a permanent magnet 9 in the form of a tile mounted on a support 17 and associated with a magneto-sensitive probe 10. For example, the magnet 9 can be magnetized sinusoidally so as to lead to an optimized detection of its position by measuring the change in direction according to the teachings of the patent EP1989505. The light emitting diode 11 is placed in the space situated behind the support 17 and opposite a fixed or mobile translucent button 7 allowing through the light beam 5.

Figure 5:
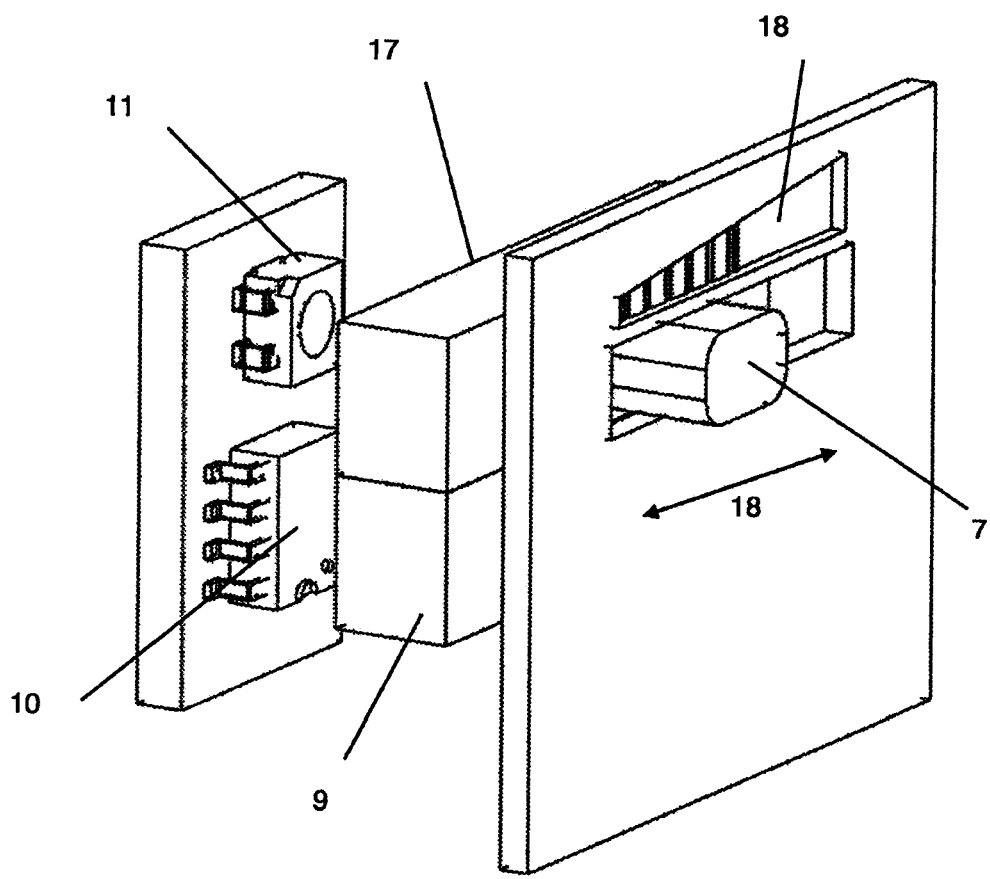
FIG. 5 shows the position-indicating module in a second linear embodiment.

FIG. 5 shows a 3D view of an exemplary embodiment and implementation of a linear alternative solution. The mobile element 1 this time consists of a parallelepiped permanent magnet 9 fixed to a support 17 which collects and directs the light issuing from the light emitting diode 11 to the button 7, with the mobile element 1 moving laterally along the solid double arrow 18. Moving the button 7 allows for example to adjust a physical parameter of a device (sound volume, a process temperature . . . ) on a display 18 via the accurate variation in the electrical signal generated by the probe 10 which is placed close to the magnet 9. The second item of information issuing from a variation in the color or the intensity of the light passing through the button 7 is itself correlated to the electrical signal from the probe 10. For example, the user can then be provided with a blue color to indicate a cold temperature and a red color for a hot temperature and a composition of colors indicating the intermediate temperatures.

Figure 6:
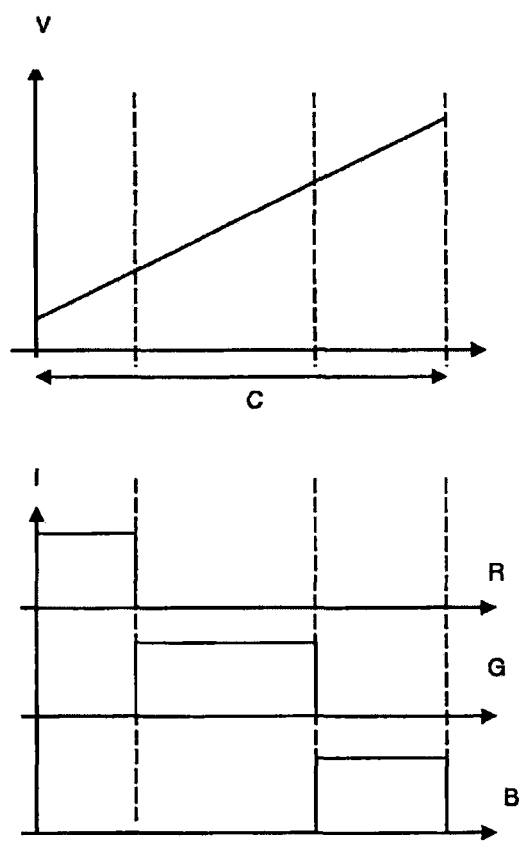
FIG. 6 shows, in a first particular embodiment, graphical views of the signals from the position-indicating module.

FIG. 6 shows a basic management system of the illumination element making it possible to generate a color illumination varying by stages from a three-color LED. The two graphs in FIG. 6, show in the upper part, the evolution of the sensor output voltage (V) according to the position on the travel of the mobile element (C) and, in the lower part, the evolution of the color (I) intensity according to the position on the same travel (C). The possible evolution, given here by way of example, of the colors (R for red, G for green and B for blue) according to the position on the travel can be thus seen (C).

Figure 7:
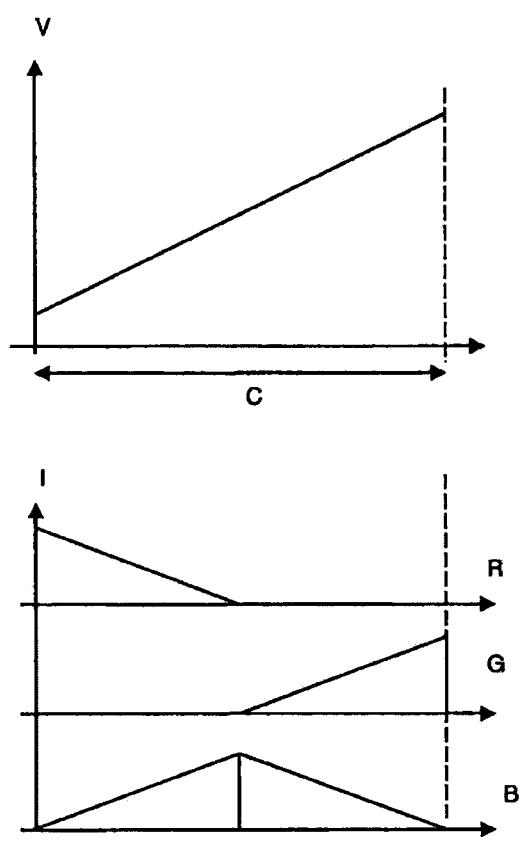
FIG. 7 shows, in a second particular embodiment, graphical views signals from the position-indicating module.

FIG. 7 shows a basic management system of the illumination element making it possible to generate a color illumination continuously variable according to the position, from a three-color LED. The two graphs in FIG. 7, show in the upper part, the evolution of the sensor output voltage (V) according to the position on the travel of the mobile element (C) and, in the lower part, the evolution of the color (I) intensity according to the position on the same travel (C). The possible evolution, given here by way of example, of the colors (R for red, G for green and B for blue) according to the position on the travel can be thus seen (C).

Figure 8:
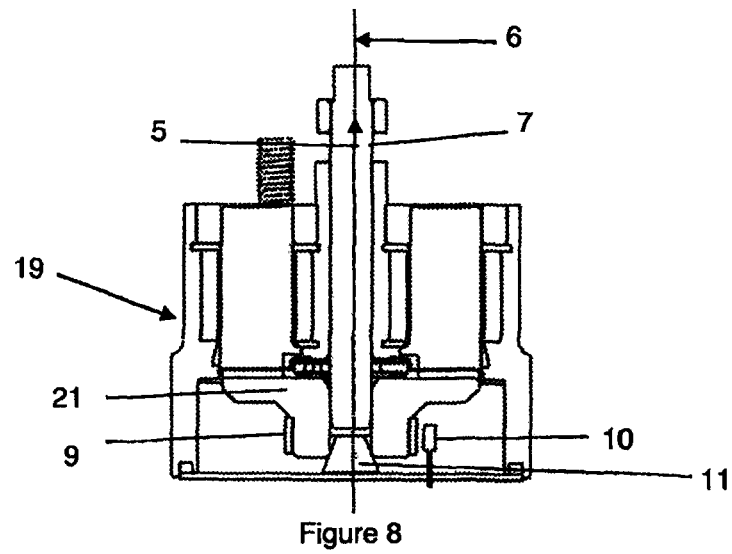
FIG. 8 shows the position-indicating module associated with a direct drive element.

FIG. 8 shows schematically and in a sectional view, a positioning assembly consisting of a direct drive element 19 such as, for example, the rotating electromagnetic actuator described in patent FR2670629 associated with a position-indicating module.

The drive element 19 comprises a rotor consisting of a yoke 21 made of ferromagnetic material and a permanent magnet 9 mounted on the outside of the yoke 21. The magnet 9 is used for the position detection by the probe 10.

The yoke 21 is integral with a button 7, as an output axis, at least partially translucent able to allow through the light beam 5 issuing from the LED 11 placed on the axis of rotation 6 of the yoke 21.

In an alternative solution (not shown here), it could also be considered, in the case of a drive element 19 using a motor magnet, to use the magnet to produce the mechanical stress and also to provide information on the position detected by the probe 10 so as to have a single magnet in the global system created.

Figure 9:
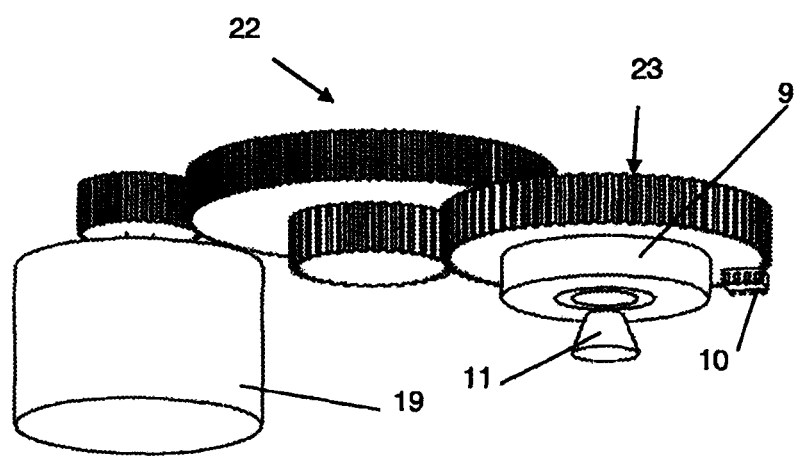
FIG. 9 shows the position-indicating module associated with a drive element using a reduction gear train.

FIG. 9 shows a positioning assembly comprising a drive element 19 associated with a gear train 22 and a position-indicating module such as described by the invention.

The drive element 19 is here an electric motor, typically but not restrictively of the brushless step-by-step type, which drives a gear train 22 achieving a reduction of the movement and comprising multiple stages. The permanent magnet 9 is integral and concentric with the output wheel 23 comprising an opening 4 opposite which the light-emitting diode 11 is placed, with said opening 4 being able then to accommodate an axis (not shown) having a translucent portion. A magneto-sensitive probe 10 is close to the magnet 9 for detecting the position of the output wheel 23 and to allow the change in the light signal of the light emitting diode 11 in the axis (not shown).

In an alternative embodiment, the module further comprises a sensor detecting the magnet 9 penetration relative to the rest position thereof. This detector may be constituted by an electrical contact or any other equivalent means. It makes it possible to save an angular position of the button by pressing the latter, for example to store the signal corresponding to the position when the key was pressed. The detected action may lead to a change in the lighting control law, for example the passage from a control law wherein the color and/or intensity varies according to the angular position, to a law control wherein the lighting becomes constant until the button is pressed again for example.

The invention claimed is:

1. A position-indicating module comprising:
a position sensor including a mobile permanent magnet operably driven directly by an operator or by a mechanical or electromechanical drive;
a detection assembly delivering electrical information dependent on the position of the mobile permanent magnet, without contact with the mobile permanent magnet;
at least one illumination light source;
the mobile permanent magnet comprising a zone operably allowing through the light beam issuing from the illumination light source and the illumination light source being situated opposite the zone;
the mobile permanent magnet generating magnetic flux; and
the detection assembly comprising at least one magneto-sensitive probe detecting penetration of the mobile permanent magnet relative to a rest position thereof.

2. A position-indicating module according to claim 1, wherein the state of electric power supply to the illumination light source is dependent on the signal delivered by the detection assembly.

3. A position-indicating module according to claim 1, wherein the detection assembly delivers an absolute signal proportional to the position of the mobile permanent magnet.

4. A position-indicating module according to claim 1, wherein the detection assembly delivers a signal in the form of discrete stages dependent on the position of the mobile permanent magnet.

5. A position-indicating module according to claim 1, further comprising color or the intensity of light issuing from the illumination light source being dependent on a signal delivered by the detection assembly.

6. A position-indicating module according to claim 1, further comprising color or intensity of the light issuing from the illumination light source continuously varying and being proportional to a signal delivered by the detection assembly.

7. A position-indicating module according to claim 1, further comprising color or intensity issuing from the illumination light source discretely varying according to a signal delivered by the detection assembly.

8. A position-indicating module according to claim 1, wherein the illumination light source comprises several light sources situated substantially at the same point.

9. A position-indicating module according to claim 8, wherein at least one of the light sources emits a different color from the other ones.

10. A position-indicating module according to claim 1, wherein the illumination light source is a light emitting diode (LED).

11. A position-indicating module according to claim 10, wherein the illumination light source is a multicolored light emitting diode (LED).

12. A position-indicating module according to claim 1, wherein the position sensor measures the linear position of the mobile permanent magnet.

13. A position-indicating module according to claim 1, wherein the position sensor measures the rotation of the mobile permanent magnet.

14. A position-indicating module according to claim 13, wherein the sensor measures a combined movement.

15. A position-indicating module according to claim 14, wherein the at least one of the illumination light source is situated on an axis of rotation of the mobile permanent magnet.

16. A position-indicating module according to claim 1, wherein the detection assembly and the illumination light source are arranged in a common plane.

17. A position-indicating module according to claim 1, wherein the detection assembly and the illumination light source are arranged on a common printed circuit.

18. A position-indicating module according to claim 1, wherein the mobile permanent magnet, the detection assembly and the illumination light source are arranged in a common case.

19. A position-indicating module comprising:
a position sensor including a mobile element operably driven directly by an operator or by a mechanical or electromechanical drive element;
a detection assembly delivering electrical information dependent on the position of the mobile element, without contact with the mobile element;
at least one illumination element comprising at least one light source; and
the mobile element comprising a zone operably allowing through the light beam issuing from the illumination element and the illumination being situated opposite the zone;
wherein the zone able to allow through the light beam is an opening and a button is positioned in the opening.

20. A position-indicating module according to claim 19, wherein the detection assembly comprises at least one magneto-sensitive probe.

21. A position-indicating module according to claim 19, wherein the mobile element comprises at least one magnetic flux generating ring magnet.

22. A position-indicating module according to claim 19, wherein the button is integral with the mobile element.

23. A position-indicating module according to claim 22, wherein the button is at least partially made of a translucent material operable to guide the light issuing from the illumination element.

* * * * *